(12) United States Patent
Avraham et al.

(10) Patent No.: US 12,547,493 B2
(45) Date of Patent: Feb. 10, 2026

(54) MULTI-STAGE DECODER WITH ADAPTIVE LEARNING

(71) Applicant: Sandisk Technologies, Inc., Milpitas, CA (US)

(72) Inventors: David Avraham, Even Yehuda (IL); Ran Zamir, Ramat Gan (IL); Eran Sharon, Rishon Lezion (IL)

(73) Assignee: Sandisk Technologies, Inc., Milpitas, CA (US)

( * ) Notice: Subject to any disclaimer, the term of this patent is extended or adjusted under 35 U.S.C. 154(b) by 18 days.

(21) Appl. No.: 18/545,831

(22) Filed: Dec. 19, 2023

(65) Prior Publication Data
US 2025/0199903 A1     Jun. 19, 2025

(51) Int. Cl.
*G06F 11/10* (2006.01)
(52) U.S. Cl.
CPC .............................. *G06F 11/1004* (2013.01)
(58) Field of Classification Search
None
See application file for complete search history.

(56) References Cited

U.S. PATENT DOCUMENTS

| | | | | |
|---|---|---|---|---|
| 2010/0088575 | A1* | 4/2010 | Sharon | H03M 13/6591 714/763 |
| 2013/0166986 | A1* | 6/2013 | Alrod | G06F 11/1048 714/755 |
| 2013/0166988 | A1* | 6/2013 | Sharon | G06F 11/1012 714/E11.032 |
| 2013/0246878 | A1* | 9/2013 | Pancholi | H03M 13/21 714/752 |
| 2018/0293131 | A1* | 10/2018 | Lin | G06F 11/1072 |

* cited by examiner

*Primary Examiner* — Guerrier Merant
(74) *Attorney, Agent, or Firm* — DENTONS Durham Jones Pinegar

(57) ABSTRACT

A data storage device includes an error correction code (ECC) system and a decoder gear determination system. The decoder gear determination system dynamically enhances error correction capabilities of a decoder of the ECC system should the decoder fail to decode a codeword. The decoder gear determination system enhances the error correction capabilities of the decoder prior to initiating a gear switch, in which another decoder, with higher error correction capabilities, is used to decode the codeword. The decoder gear determination system enhances the error correction capabilities of the decoder by deriving information about the failed decoding attempt. The derived information is used to generate an updated decoding parameter that is provided to the decoder. The decoder attempts a subsequent decoding process on the codeword using the updated decoding parameter.

20 Claims, 7 Drawing Sheets

MULTI-STAGE DECODER WITH ADAPTIVE LEARNING

BACKGROUND

When data is written to a data storage device, such as a NAND data storage device, the data is associated with additional redundant bits, or error correction code (ECC) bits. The data and the ECC bits are used to generate a codeword that is stored in the data storage device. During a read operation, the codeword is retrieved and analyzed to determine whether the codeword includes any errors. If errors are detected, a decoder is used to correct the errors.

Some data storage devices utilize a number of different decoders and each decoder has different error correction capabilities, power consumption profiles, latencies and speeds. For example, an ultra-low power (ULP) decoder is typically faster when compared to a Low Power (LP) decoder and a Full Power (FP) decoder. However, the correction capabilities of the ULP decoder are more limited when compared to the correction capabilities of the LP decoder and the FP decoder.

In examples in which the data storage device uses different decoders, the ULP decoder is used first. If the ULP decoder fails to correct the errors in the codeword, a "gear shift" occurs and the LP decoder is used to correct the errors. If the LP decoder also fails to correct the errors in the codeword, another gear shift occurs and the FP decoder is used.

While each gear shift increases the probability that the errors in the codeword will be corrected, latency and power consumption requirements also increase. As a result, throughput and quality of service (QOS) metrics of the data storage device may be negatively impacted.

Accordingly, it would be beneficial to improve the error correction capabilities of decoders having higher throughput and lower power requirements when decoding a codeword prior to performing a gear shift.

SUMMARY

Examples of the present disclosure describe a data storage device, such as, for example, a NAND data storage device, that includes a decoder gear determination system. The decoder gear determination system dynamically increases or enhances the error correction capabilities of a first type of decoder (e.g., an Ultra-Low Power (ULP) decoder) if the first type of decoder fails to decode/correct a codeword. If the enhanced first type of decoder cannot decode/correct the codeword, the decoder gear determination system initiates the gear shift and a second type of decoder (e.g., a decoder with better error correction capabilities but increased latency and/or power consumption requirements when compared to the first type of decoder) is used to decode/correct the codeword.

In order to enhance the correction capabilities of the first type decoder, the decoder gear determination system determines or identifies a first decoding parameter that is used by the first type of decoder during a first decoding process. If the first decoding process is unsuccessful, the decoder gear determination system derives information about the unsuccessful decoding attempt. The derived information, along with information about the first decoding parameter that was used during the first decoding process, is used to dynamically generate and/or determine an updated decoding parameter.

The decoder gear determination system provides the updated decoding parameter to the first type of decoder and a second decoding process is initiated. If the second decoding process is unsuccessful, the decoder gear determination system determines that a second type of decoder should be used for a third decoding process and initiates a gear shift. The second type of decoder is used for the third decoding process and the process repeats.

Accordingly, examples of the present disclosure describe a method that includes initiating a first decoding process on a codeword using a decoder of a first type. In an example, the first decoding process utilizes a first decoding parameter. Based, at least in part, on determining the first decoding process is unsuccessful, information associated with the first decoding process is derived. A second decoding process using the decoder is initialized. In an example, the second decoding process utilizes an updated parameter that is based, at least in part, on the information derived from the first decoding process.

Other examples describe a data storage device that includes a controller, a first decoder of a first type and a second decoder of a second type that is different from the first type. The data storage device also includes a decoder gear determination system communicatively coupled to the controller and the first and second decoders. The decoder gear determination system derives decoding information from a failed codeword decoding process executed by the first decoder. In an example, the derived decoding information includes information about the failed codeword decoding process. The decoder gear determination system also generates a decoding parameter based, at least in part, on the derived decoding information and causes the first decoder to initiate a codeword decoding process using the decoding parameter.

In yet another example, the present disclosure describes a data storage device that includes a control means and a decoder gear selection means communicatively coupled to the control means. The decoder gear selection means is operable to initiate a first decoding process on a codeword using a decoding means. In an example, the first decoding process utilizes a first decoding parameter. Based, at least in part, on determining the first decoding process is unsuccessful, information associated with the first decoding process is derived. A second decoding parameter is generated based, at least in part, on the information derived from the first decoding process. A second decoding process is initiated on the codeword using the decoding means. In an example, the second decoding process utilizes the second decoding parameter.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
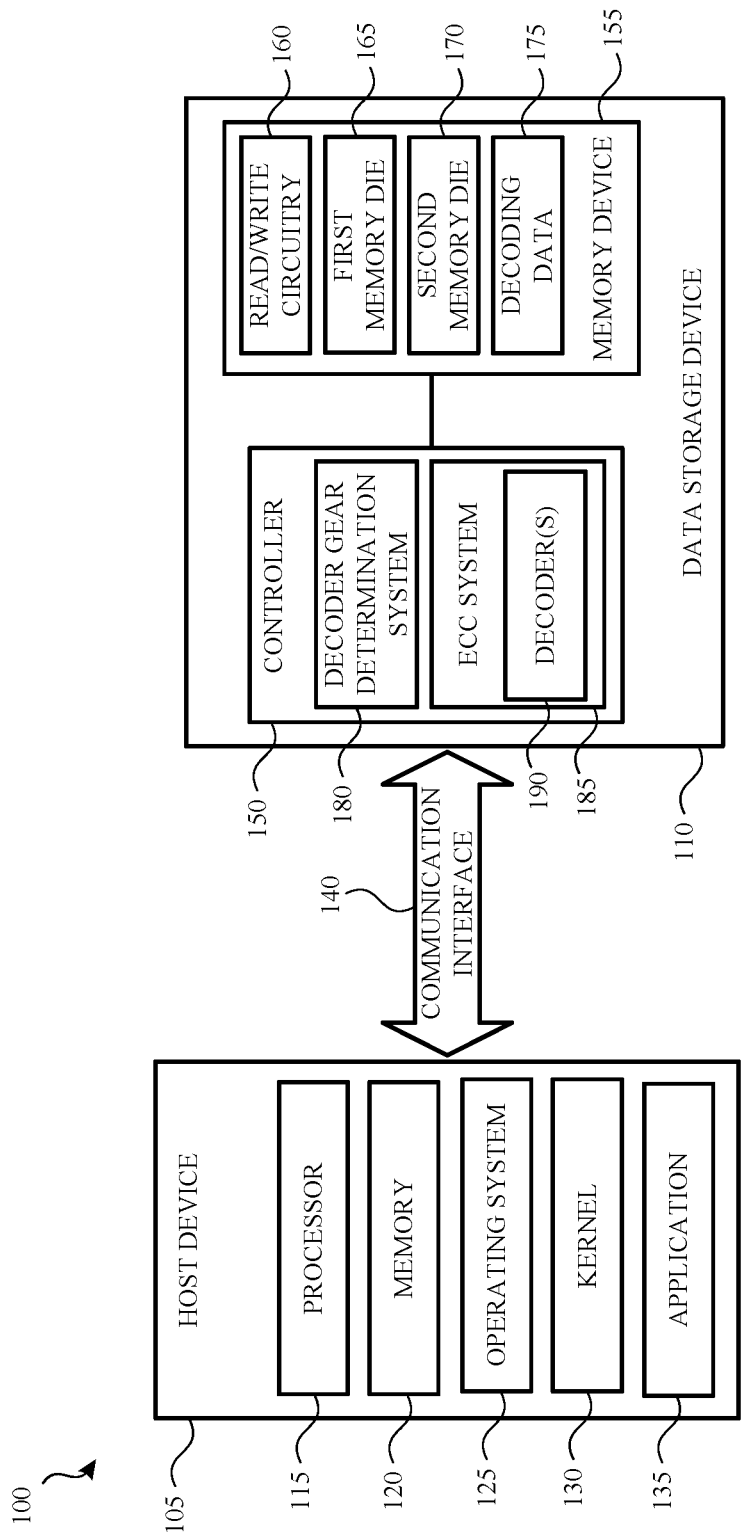
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

Some data storage devices, such as, for example, NAND data storage devices, utilize a number of different decoders during an error correction code (ECC) process. Each decoder has different error correction capabilities, power consumption profiles, latency profiles and speeds. For example, an Ultra-Low Power (ULP) decoder is typically faster when compared to a Low Power (LP) decoder and a Full Power (FP) decoder. However, the error correction capabilities of the ULP decoder is limited when compared to the error correction capabilities of the LP decoder and the FP decoder.

During a codeword decoding process, the ULP decoder is typically used first. However, if the ULP decoder fails to decode and/or correct the errors in the codeword, the data storage device implements a gear shift and a LP decoder is used in a subsequent codeword decoding process. However, if the LP decoder also fails to correct the errors in the codeword, another gear shift occurs and the FP decoder is used.

While each gear shift increases the probability that the errors in the codeword will be corrected, latency and power consumption requirements of the decoders also increase. As a result, throughput and quality of service (QOS) metrics of the data storage device may be negatively impacted.

To address the above, the present disclosure describe a decoder gear determination system for a data storage device. The decoder gear determination system (also referred to as a decoder gear selection system) monitors one or more decoding processes performed by different types of decoders. For example, the decoder gear determination system monitors a first decoding process performed by a first type of decoder (e.g., a ULP decoder). If the first decoding process is unsuccessful or fails, the decoder gear determination system improves or enhances the error correction capabilities of the first decoder. In an example, the decoder gear determination system improves/enhances the error correction capabilities of the first decoder prior to initiating or enabling a gear shift, in which a second type of decoder (e.g., a decoder with better error correction capabilities but increased latency and/or power consumption requirements when compared to the first type of decoder) is used to decode the codeword.

For example, the decoder gear determination system determines or identifies a first parameter (or a first set of parameters) that was used by the first type of decoder during the first decoding process. If the first decoding process is unsuccessful, the decoder gear determination system derives information about the unsuccessful attempt. The derived information, along with information about the first parameter (or the first set of parameters) that was used during the first decoding process, is used to dynamically generate and/or determine a second/updated parameter.

The decoder gear determination system provides the second/updated parameter to the first type of decoder and a second decoding process is initiated. If the second decoding process is also unsuccessful or fails, the decoder gear determination system determines that a second type of decoder should be used for a third decoding process. As a result, the decoder gear determination system initiates a gear shift. The second type of decoder is used for the third decoding process and the process repeats.

Using the above, the decoder gear determination system can dynamically determine or learn how to improve faster, lower latency and lower power decoders prior to performing the gear switch. For example, gathering data about each decoding attempt associated with the first decoder, and subsequently providing that data to the first decoder, enhances the error correction capabilities of the first decoder. Although multiple decoding attempts are used, in some examples, multiple decoding attempts in a lower gear will outperform a data storage system that transfers gears when the previous gear fails.

In accordance with the above, many technical benefits may be realized including, but not limited to increasing the QoS and throughput of a data storage device, reducing power requirements of the data storage device during a decoding process, and increasing the reliability and lifespan of the data storage device.

These benefits, along with other examples, will be shown and described in greater detail with respect to FIG. 1-FIG. 8.

FIG. 1 is a block diagram of a system 100 that includes a host device 105 and a data storage device 110 according to an example. In an example, the host device 105 includes a processor 115 and a memory 120 (e.g., main memory). The memory 120 may include or otherwise be associated with an operating system 125, a kernel 130 and/or an application 135.

The processor 115 can execute various instructions, such as, for example, instructions from the operating system 125 and/or the application 135. The processor 115 includes circuitry such as a microcontroller, a Digital Signal Processor (DSP), an Application-Specific Integrated Circuit (ASIC), a Field Programmable Gate Array (FPGA), hardwired logic, analog circuitry and/or various combinations thereof. In an example, the processor 115 includes a System on a Chip (SoC).

In an example, the memory 120 is used by the host device 105 to store data that is used, or otherwise executed by, the processor 115. Data stored in the memory 120 includes instructions provided by the data storage device 110 via a communication interface 140. The data stored in the memory 120 also includes data used to execute instructions from the operating system 125 and/or one or more applications 135. In an example, the memory 120 is a single memory. In another example, the memory 120 includes multiple memories, such as, for example, one or more non-volatile memories, one or more volatile memories, or a combination thereof.

In an example, the operating system 125 creates a virtual address space for the application 135 and/or other processes executed by the processor 115. The virtual address space maps to locations in the memory 120. The operating system 125 also includes, or is otherwise associated with, a kernel 130. In an example, the kernel 130 includes instructions for managing various resources of the host device 105 (e.g., memory allocation), handling read and write requests and performing other operations.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 interfaces with the data storage device 110 using a logical interface specification such as Non-Volatile Memory express (NVMe) or Advanced Host Controller Interface (AHCI).

The data storage device 110 also includes a controller 150 and a memory device 155. In an example, the controller 150 is communicatively coupled to the memory device 155. The memory device 155 includes one or more memory dies (e.g., first memory die 165 and second memory die 170). Although memory dies are specifically mentioned, the memory device 155 may include any non-volatile memory device, storage device, storage elements or storage medium including NAND flash memory cells and/or NOR flash memory cells.

The memory cells can take the form of solid-state (e.g., flash) memory cells and can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. The memory cells are arranged in a two-dimensional configuration or a three-dimensional configuration.

In some examples, the data storage device 110 is attached to or embedded within the host device 105. In another example, the data storage device 110 is implemented as an external device or a portable device that can be communicatively or selectively coupled to the host device 105. In yet another example, the data storage device 110 is a component (e.g., a solid-state drive (SSD)) of a network accessible data storage system, a network-attached storage system, a cloud data storage system, and the like.

As indicated above, the memory device 155 of the data storage device 110 includes a first memory die 165 and a second memory die 170. Although two memory dies are shown, the memory device 155 may include any number of memory dies (e.g., one memory die, two memory dies, eight memory dies, or another number of memory dies).

The memory device 155 also includes support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies include corresponding read/write circuitry 160 that is operable to read data from and/or write data to storage elements within one individual memory die independent of other read and/or write operations on any of the other memory dies.

In an example, one or more of the first memory die 165 and the second memory die 170 include one or more memory blocks. In an example, each memory block includes one or more memory cells. A block of memory cells is the smallest number of memory cells that are physically erasable together. In an example and for increased parallelism, each of the blocks may be operated or organized in larger blocks or metablocks. For example, one block from different planes of memory cells may be logically linked together to form a metablock.

As previously described, the data storage device 110 also includes at least one controller 150. The controller 150 is communicatively coupled to the memory device 155 via a bus, an interface or other communication circuitry. In an example, the communication circuitry includes one or more channels which enable the controller 150 to communicate with the first memory die 165 and/or the second memory die 170 of the memory device 155. In another example, the communication circuitry includes multiple distinct channels which enables the controller 150 to communicate with the first memory die 165 independently and/or in parallel with the second memory die 170 of the memory device 155.

The controller 150 receives data and/or instructions from the host device 105. The controller 150 may also send data to the host device 105. For example, the controller 150 may send data to and/or receive data from the host device 105 via the communication interface 140.

The controller 150 may also send data and/or commands to and/or receive data from the memory device 155. For example, the controller 150 sends data and a corresponding write command to the memory device 155 to cause the memory device 155 to store data at a specified address of the memory device 155. In an example, the write command specifies a physical address of a portion of the memory device 155.

The controller 150 also sends data and/or commands associated with one or more background scanning operations, garbage collection operations, and/or wear leveling operations. The controller 150 may also send one or more read commands to the memory device 155. In an example, the read command specifies the physical address of a portion of the memory device 155 at which the data is stored.

The controller 150 also includes or is otherwise associated with an error correction code (ECC) system 185. The ECC system 185 receives data and generates one or more ECC codewords based, at least in part, on the received data. For example, the ECC system 185 includes at least one encoder that encodes the received data using one or more encoding techniques.

The ECC system 185 also includes at least one decoder 190 that decodes data read from the memory device 155. In an example, the ECC system 185 includes multiple decoders 190. Some of the decoders 190 are of a first type and have a first amount of error correction capabilities, speed, power requirements and/or latency profile while some of the decoders 190 are of a second type and/or a third type that have second/third amount of error correction capabilities, speeds, power requirements and/or latency profiles. For example, the ECC system 185 includes one or more Ultra-Low Power (ULP) decoders, one or more Low Power (LP) decoders and one or more Full Power (FP) decoders. For example, the ECC system 185 includes two or more of the same type and/or two or more decoders of different types. In such an example, the decoders 190 can be part of a pool of decoders.

In an example, the ULP decoder is a bit-flipping decoder and the LP decoder and the FP decoders are belief propagation (BP) decoders. As such, the ULP decoder is more power and cost efficient (in the relative bit error rate (BER) range) when compared with the LP decoder and the FP decoder. Additionally, the ULP decoder can be used with higher parallelism or a higher clock frequency when compared with the LP decoder and FP decoder. Thus, the ULP decoder allows for higher decoding throughput while keeping the power consumption relatively constant when compared with the LP decoder and the FP decoder. However, as previously described, the ULP decoder has limited correction capabilities when compared with the with the LP decoder and the FP decoder.

When decoding a codeword, the ECC system 185 will attempt to decode the codeword using the ULP decoder. If that is unsuccessful, the ECC system 185 implements a gear shift and a higher gear decoder, such as a LP decoder, is used to decode the codeword. Likewise, if the LP decoder fails to decode the codeword, the ECC system 185 implements another gear shift and the FP decoder is used to decode the codeword.

However, prior to implementing the gear shift, a decoder gear determination system 180 associated with the ECC system 185 enhances the error correction capabilities of the decoder that is first used (e.g., the ULP decoder) to decode the codeword. In an example, using a lower gear (e.g., faster) decoder multiple times, especially one that has had its error correction capabilities enhanced, before switching to a higher gear decoder, may outperform a comparable system that automatically switches to a higher gear decoder when a decoding operation fails.

In order to enhance the decoder 190, the decoder gear determination system 180 monitors, selects, identifies and/or tracks one or more decoding parameters used by the decoder during a codeword decoding process/operation. The decoder gear determination system 180 also monitors the results of the decoding process. Using the one or more decoding parameters and/or the results of the decoding process, the decoder gear generation system 180 derives an updated decoding parameter that is provided to the same decoder for a second decoding process, should the first decoding process fail.

For example, using information obtained from the first decoding process, the decoder gear generation system 180 generates the updated decoding parameter and provides the updated decoding parameter to the decoder 190. During a second decoding process, the decoder 190 uses the updated decoding parameter to enhance or improve its error correction capabilities. This process continues N times until the codeword is decoded or until the decoder gear determination system 180 determines it is time to implement a gear shift and switch to a different type of decoder 190 (e.g., a LP decoder).

In an example, the one or more decoding parameters that are used by the decoder 190 include, but are not limited to, a decoding schedule, a bit flip threshold, a log likelihood ratio (LLR), a way in which artificial soft bits (ASBs) are marked, a dynamic bit skipping method (DBS) and a number of decoding iterations.

In an example, the decoding schedule specifies which variables or equations in a low-density parity-check (LDPC) code is used and/or executed at particular times. For example, each variable in a LDPC code equation can be selected at any time. In some examples, altering the order of selection/execution of the variables or equations impacts the outcome of the decoding operation.

To determine the bit flip threshold, the decoder gear determination system 180 monitors a particular variable (or bit) and determines how many equations (e.g., LDPC equations) that are connected to this particular variable, are satisfied. For example, if over a threshold number of equations that are connected to the particular variable are satisfied, the decoder gear determination system 180 determines that the particular variable is correct. However, if that number falls below the bit flip threshold (e.g., the decoder gear determination system 180 determines that a threshold number of equations that are connected to this particular variable are not satisfied), the decoder gear determination system 180 determines that the particular variable is incorrect.

In an example, each variable is connected or associated with the same number of equations or a different number of equations. As such, each variable may have the same bit flip threshold or a different bit flip threshold. In an example, the bit flip threshold for a particular variable is based, at least in part, on a number of equations that are connected to or otherwise associated with, the particular variable.

In another example, the bit flip threshold of the particular variable is based, at least in part, on a number of times a decode attempt on the particular variable has occurred. For example, the first time the particular variable is decoded, a first bit flip threshold may be used. However, the bit flip threshold may be lowered (or raised) during one or more subsequent decoding attempts.

In an example, the LLR decoding parameter is a value that is assigned to a variable or bit that indicates a confidence level of the decoder gear determination system 180. The confidence level is a value that indicates whether the variable or bit is correct. For example, a high magnitude may indicate that the bit is correct while a low value may indicate that the bit is incorrect where the sign will indicate if the bit is a "0" or a "1". In an example, the value of the LLR decoding parameter may also be changed to change the behavior of the decoder 190.

In another example, the way in which ASBs are marked is a decoding parameter that indicates variables or bits that are suspected bit flips (or alternatively assumed to be true/correct) by the decoder 190. In an example, the decoder 190 marks these bits as ASBs due to their behavior during the decoding process (e.g., the number of satisfied and unsatisfied equations for a specific bit are equal after a certain amount of decoding iterations). In an example, ASBs receive deferential treatment by the decoder 190 which may differ from other bits that have the same value but have not been marked.

The DBS decoding parameter is used to identify or mark variables or bits that will be skipped or otherwise won't be processed during one or more decoding operations/iterations. In an example, the bits are skipped during some of the decoding iterations based, at least in part, on a decoding state of the bits in order to expedite the decoding process. For example, a bit will be skipped if that bit is only connected to satisfied equations. As such, the bit will not be processed for the X iterations.

The number of decoding iterations is a decoding parameter that specifies the number of iterations for a particular decoding operation. The number of decoding operations may be any number.

If the decoding process with one or more of the decoding parameters fail, the decoder gear determination system 180 analyzes the output of the decoding process to determine if anything can be learned or derived from the failed decoding process. This information is subsequently provided to the decoder 190 to enhance the error correction capabilities of the decoder 190. In an example, this process is initiated at least once prior to initiating a gear shift.

For example, the output of one or more of the decoding process may indicate that a threshold amount of the decoding iterations attempted to flip a particular bit or variable. As such, the decoder gear determination system 180 determines that this particular bit has a high probability to be flipped. This information, along with the decoding parameter, is used to generate an updated decoding parameter. The updated decoding parameter is then provided to the decoder 190 to enhance its error correction capabilities.

Additional information that may be derived from the decoding process includes, but is not limited to, an indication that one or more bits were flipped from an initial state during the failed codeword decoding process; an indication that one or more bits were flipped at any time during the failed codeword decoding process (and may have flipped back); an indication that one or more bits were flipped more than a predetermined number of times during the failed codeword decoding process (and may have flipped back); an indication that one or more bits were identified as ASBs; an indication that one or more bits have a LLR value below a LLR value threshold; an indication that one or more bits were flipped during different phases (e.g., a beginning or an end) of the failed codeword decoding process; and an indication that one or more bits were flipped when a syndrome weight (SW) is above a SW threshold (e.g., the SW is not equal to zero). In an example, the SW indicates an amount of equations that aren't satisfied during an LDPC code operation. Thus, a higher SW indicates a higher BER.

When this additional information is determined or identified, the decoder gear determination system 180 uses the information, along with the decoding parameter, to generate the updated decoding parameter.

Additionally, the decoder gear determination system 180 can also change one or more decoding dynamics of a subsequent decoding attempt executed by the decoder 190. In an example, the decoding dynamics are based, at least in part, on the additional information. For example, the decoder gear determination system 180 uses the additional/derived information to generate and/or mark one or more bits as ASBs. In another example, the decoder gear determination system 180 uses the additional/derived information to change a decoding order of the bits or variables (e.g., start the decoding process with variables that have high/low amount of marked bits). In yet another example, the decoder gear determination system 180 uses the additional/derived information to change the bit flip threshold per clock to induce more/fewer flips for certain variables/bits during different decoding processes/operations. In an example, the additional/derived information, including the decoding dynamics listed above, may also be combined with one or more of the decoding parameters previously discussed.

In an example, the decoder gear determination system 180 causes the decoder 190 to execute one or more decoding attempts using the decoding parameters. In an example, each decoding attempt utilizes a different decoding parameter. For example, a first decoding attempt uses a first decoding parameter (or a first set of decoding parameters) and a second decoding attempt uses a second decoding parameter (or a second set of decoding parameters). In an example, this continues until a predefined number (or a threshold number) of decoding attempts have occurred.

After each failed decoding attempt, the decoder gear determination system 180 derives the additional information and generates one or more updated decoding parameters. The updated decoding parameters are then provided to the decoder 190 for a subsequent decoding attempts.

This process continues until a threshold number of subsequent decoding attempts is reached, the codeword is successfully decoded or until the decoder gear determination system 180 initiates a gear switch. When the gear switch is initiated, a second type of decoder is used to decode the codeword and the process repeats.

Figure 2:
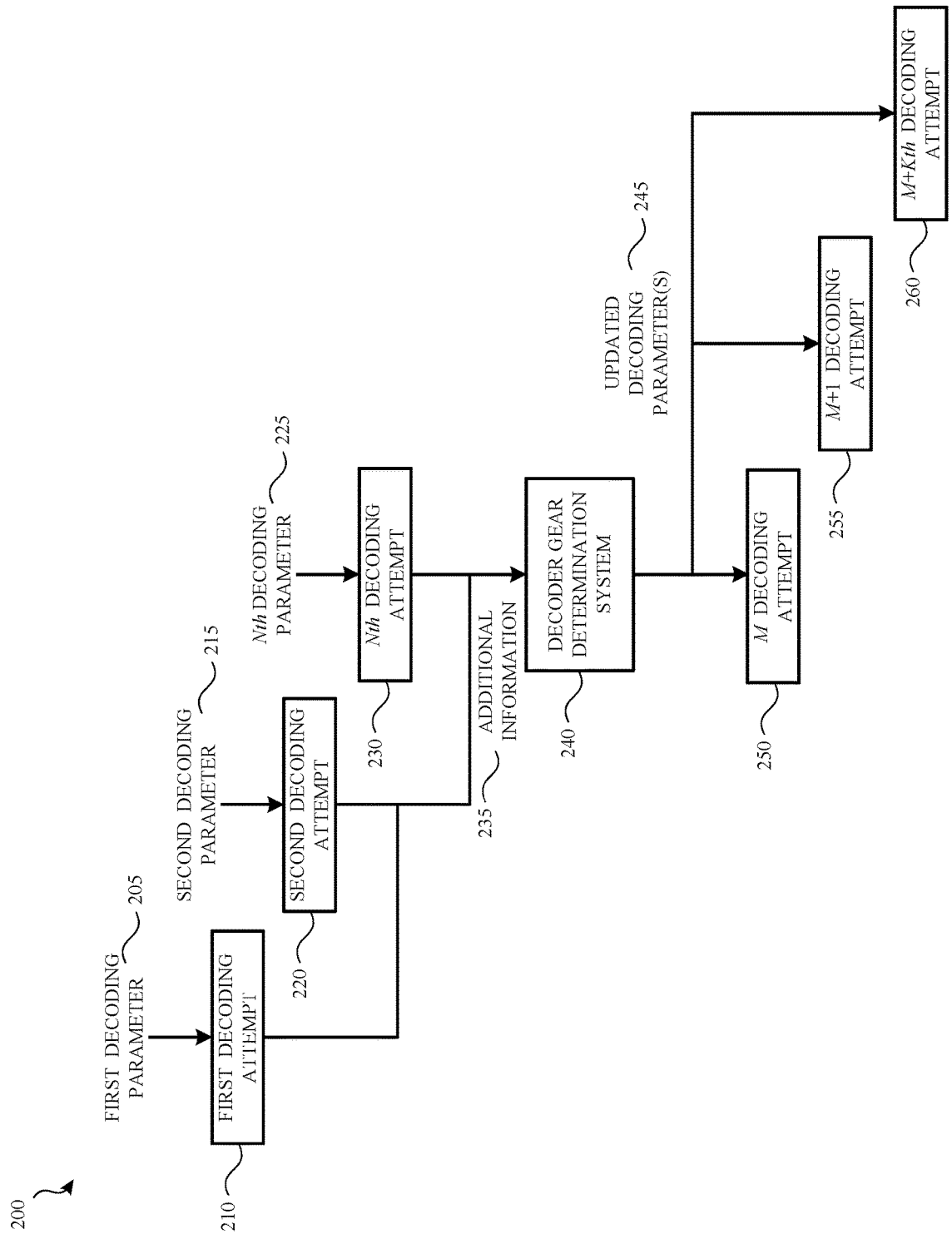
FIG. 2 is a flow diagram that illustrates how error correction capabilities of a decoder are updated with derived information according to a first example.

FIG. 2 is a flow diagram 200 that illustrates how error correction capabilities of a decoder are updated with derived information according to a first example. In an example, the decoder is similar to the decoder 190 shown and described with respect to FIG. 1. Additionally, the decoder is a first type of decoder having a first amount of error correction capabilities. For example, the decoder is a ULP decoder. In another example, the decoder is a LP decoder.

In the example shown, the decoder is operable to execute a number of different decoding attempts using different decoding parameters. For example, the decoder executes a first decoding attempt 210 using a first decoding parameter 205. If an ECC system (e.g., ECC system 185 (FIG. 1)) and/or a decoder gear determination system 240 determines that the first decoding attempt 210 is unsuccessful or has failed, additional information 235 associated with the first decoding attempt 210 is provided to the decoder gear determination system 240. In an example, the decoder gear determination system 240 is similar to the decoder gear determination system 180 shown and described with respect to FIG. 1.

Additionally, if the first decoding attempt 210 fails, the decoder gear determination system 240 (or the ECC system) causes the decoder to execute a second decoding attempt 220. In an example, the second decoding attempt 220 uses a second decoding parameter 215 that is different than the first decoding parameter 205. If the second decoding attempt 220 is unsuccessful, additional information 235 associated with the second decoding attempt 220 is provided to the decoder gear determination system 240.

This process repeats for a predetermined number of times (e.g., N times) or until the codeword is successfully decoded. For example, if the second decoding attempt 220 is unsuccessful, the decoder executes a Nth decoding attempt 230 using a Nth decoding parameter 225. As with the other attempts, should the Nth decoding attempt 230 fail, additional information 235 associated with the Nth decoding attempt 230 is provided to the decoder gear determination system 240.

As previously discussed, the additional information 235 associated with each decoding attempt includes information about the decoding parameters that were used in each decoding attempt and/or information/data associated with the failed decoding attempt. For example, the decoding parameters include, but are not limited to, a decoding schedule, a bit flip threshold, a LLR associated with one or more bits or variables, a way in which artificial soft bits ASBs are marked, a DBS method and/or a number of decoding iterations/attempts.

In an example, the additional information 235 associated with each decoding attempt includes, but is not limited to, an indication that one or more bits were flipped from an initial state during the failed codeword decoding process; an indication that one or more bits were flipped at any time during the failed codeword decoding process (and may have flipped back); an indication that one or more bits were flipped more than a predetermined number of times during the failed codeword decoding process (and may have flipped back); an indication that one or more bits were identified as ASBs; an indication that one or more bits have a LLR value below a LLR value threshold; an indication that one or more bits were flipped during different phases (e.g., a beginning or an end) of the failed codeword decoding process; and an indication that one or more bits were flipped when a SW is above a SW threshold.

When the additional information 235 associated with one or more of the decoding attempts is received, the decoder gear determination system 240 uses the additional information 235 to generate one or more updated decoding parameters 245. In an example, the updated decoding parameters 245 are used to enhance the error correction capabilities of the decoder and to change the decoding dynamics of subsequent decoding attempts.

For example, the decoder gear determination system 240 uses the additional information 240 to generate and/or mark one or more bits as ASBs. In another example, the decoder gear determination system 240 uses the additional information 235 to change a decoding order of the bits or variables in a codeword. In yet another example, the decoder gear determination system 240 uses the additional information 235 to change the bit flip threshold per clock to induce more/fewer flips for certain variables/bits for subsequent decoding operations. The decoder gear determination system 240 can also use one or more of the N decoding parameters to generate the one or more updated decoding parameters 245.

In an example, when the one or more updated decoding parameters 245 have been generated by the decoder gear determination system 240, the updated decoding parameters 245 are provided to the decoder for subsequent decoding attempts. In an example, a unique updated decoding parameter 245 is provided to the decoder for each subsequent decoding attempt. For example, a first updated decoding parameter is provided to a M decoding attempt 250. If the M decoding attempt 250 is unsuccessful, a second updated decoding parameter is provided to a M+1 decoding attempt 255. Likewise, if the M+1 decoding attempt 255 is unsuccessful, a Kth updated decoding parameter 245 is provided to a M+Kth decoding attempt 260.

In an example, if the M+Kth decoding attempt 260 is unsuccessful, the decoder gear determination system 240 initiates a gear shift and a second type of decoder is used to decode the codeword. In this example, the second type of decoder has better error correction capabilities when compared with the first type of decoder.

In the example shown in FIG. 2, the decoding attempts are executed in sequence. For example, a time period in which one decoding attempt is occurring or is executed arises prior to or subsequent to a time period in which another decoding attempt is occurring or is executed. However, is some examples, the decoding attempts may be executed in parallel.

Figure 3:
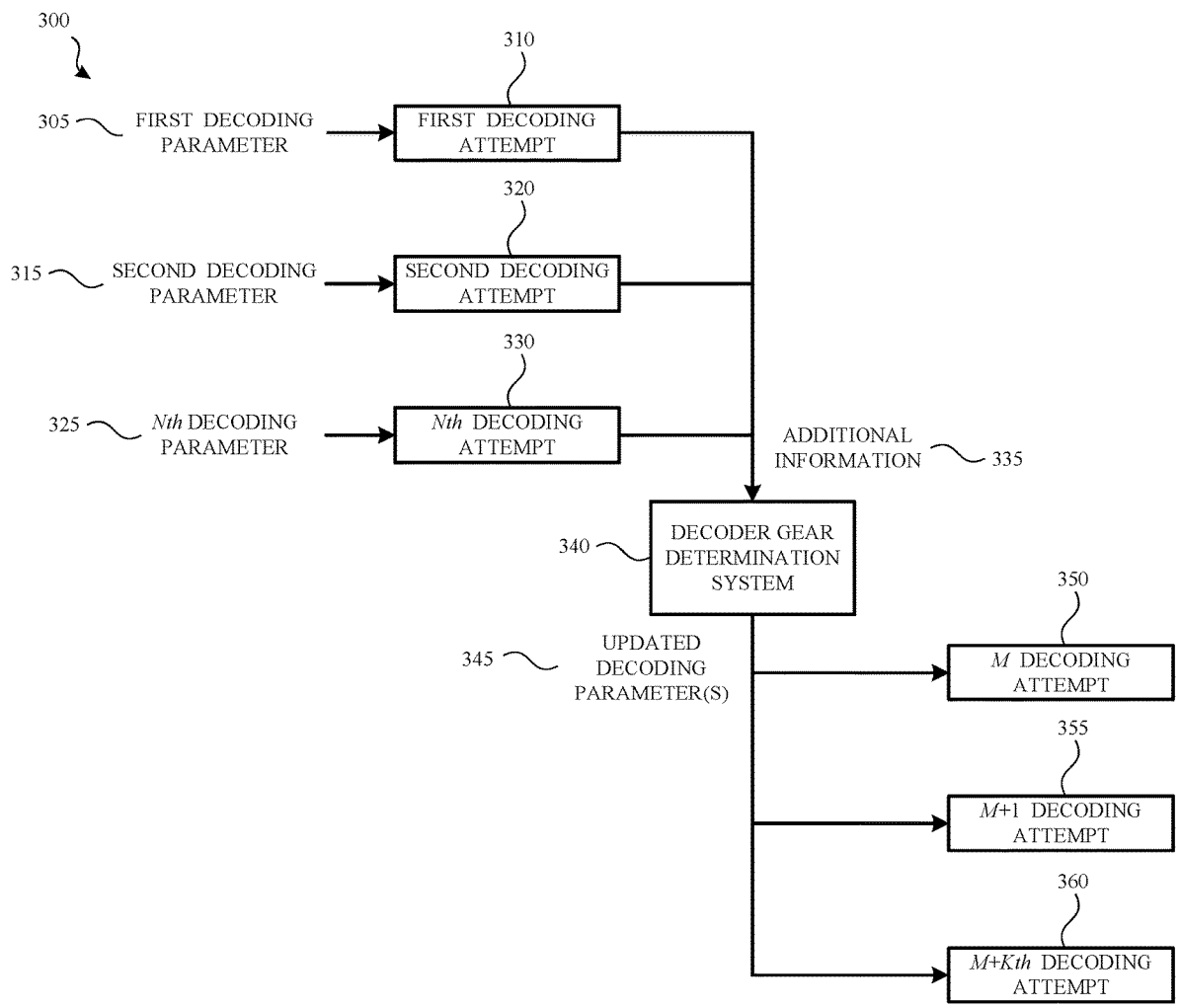
FIG. 3 is a flow diagram that illustrates how error correction capabilities of a decoder are updated with derived information according to a second example.

FIG. 3 is a flow diagram 300 that illustrates how error correction capabilities of a decoder are updated with derived information according to a second example. Like the example shown in FIG. 2, in this example, the decoder (or decoders) is similar to the decoder 190 shown and described with respect to FIG. 1. Additionally, the decoder is a first type of decoder having a first amount of error correction capabilities.

In an example, the decoder is operable to execute a number of different decoding attempts in parallel. In an example, "in parallel" means that a time period in which one decoding attempt is occurring overlaps entirely with a time period in which another decoding attempt is occurring. In another example, "in parallel" means that a time period in which one decoding attempt is occurring overlaps, at least partially, with a time period in which another decoding attempt is occurring.

In an example, although decoding attempts are executed in parallel, each decoding attempt uses different decoding parameters. For example, a first decoding attempt 310 is executed using a first decoding parameter 305, a second decoding attempt 320 is executed using a second decoding parameter 315 that is different than the first decoding parameter 305, and an Nth decoding attempt 330 is executed or performed using an Nth decoding parameter 325.

If an ECC system (e.g., ECC system 185 (FIG. 1)) and/or a decoder gear determination system 340 determines that at least one of the decoding attempts is successful, the other decoding attempts will cease. However, if the ECC system and/or a decoder gear determination system 340 determines that all of the N decoding attempts have failed, additional information 335 associated with each of the decoding attempts is provided to the decoder gear determination system 340. In an example, the decoder gear determination system 340 is similar to the decoder gear determination system 180 shown and described with respect to FIG. 1.

When the additional information 335 associated with the N decoding attempts is received, the decoder gear determination system 340 uses the additional information 335 to generate updated decoding parameters 345. In an example, the updated decoding parameters change the decoding dynamics of subsequent decoding attempts.

When one or more updated decoding parameters 345 have been generated by the decoder gear determination system 340, the updated decoding parameters 345 are provided to the decoder for subsequent decoding attempts. In an example, the subsequent decoding attempts are executed in parallel and each subsequent decoding attempt receives a unique updated decoding parameter 345. For example, a first updated decoding parameter is provided to a M decoding attempt 350, a second updated decoding parameter is provided to a M+1 decoding attempt 355 and a Kth updated decoding parameter is provided to a M+Kth decoding attempt 360.

If the ECC system and/or a decoder gear determination system 340 determines that at least one of the subsequent decoding attempts is successful, the other subsequent decoding attempts cease. However, if none of the subsequent decoding attempts are successful, the decoder gear determination system 340 initiates a gear shift and a second type of decoder is used to decode the codeword. In an example, the second type of decoder has better error correction capabilities when compared with the first type of decoder.

Figure 4:
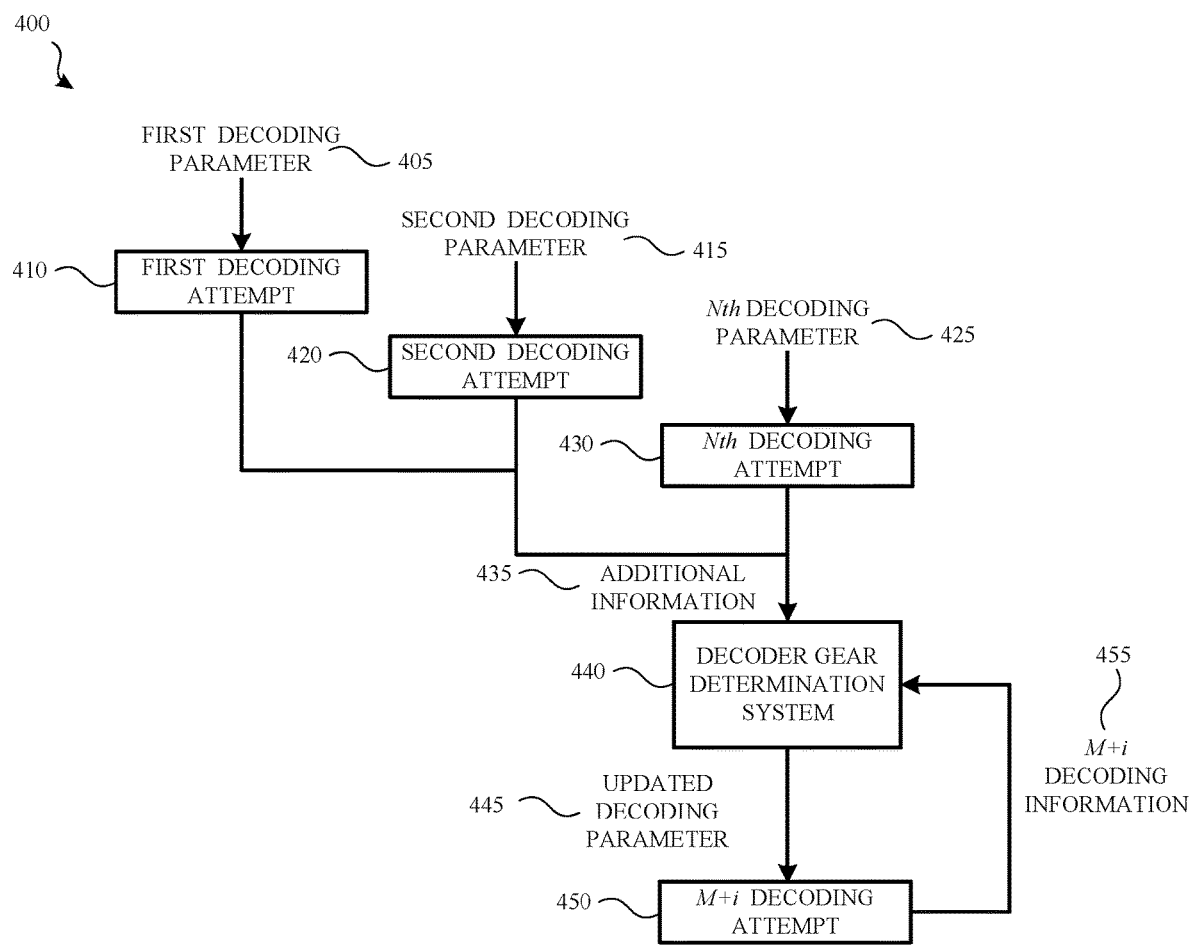
FIG. 4 is a flow diagram that illustrates how error correction capabilities of a decoder are updated with derived information according to a third example.

FIG. 4 is a flow diagram 400 that illustrates how error correction capabilities of a decoder are updated with derived information according to a third example. In an example, the decoder is similar to the decoder 190 shown and described with respect to FIG. 1. Additionally, the decoder is a first type of decoder having a first amount of error correction capabilities. For example, the decoder is a ULP decoder. In another example, the decoder is a LP decoder.

Like the example shown in FIG. 2, the decoder is operable to execute a number of different sequential decoding attempts using different decoding parameters. For example, the decoder executes a first decoding attempt 410 using a first decoding parameter 405. If the first decoding attempt 410 is unsuccessful, additional information 435 associated with the first decoding attempt 410 is provided to the decoder gear determination system 440. In an example, the decoder gear determination system 440 is similar to the decoder gear determination system 180 shown and described with respect to FIG. 1.

Additionally, the decoder gear determination system 440 causes the decoder to execute a second decoding attempt 420. In an example, the second decoding attempt 420 uses a second decoding parameter 415 that is different than the first decoding parameter 405. If the second decoding attempt 420 is unsuccessful, additional information 435 associated with the second decoding attempt 420 is provided to the decoder gear determination system 440.

This process repeats for a predetermined number of times (e.g., N times) or until the codeword is successfully decoded. For example, if the second decoding attempt 420 is unsuccessful, the decoder executes an Nth decoding attempt 430 using an Nth decoding parameter 425. As with the other attempts, should the Nth decoding attempt 430 fail, additional information 435 associated with the Nth decoding attempt 430 is provided to the decoder gear determination system 440.

The decoder gear determination system 440 uses the additional information 435 to generate an updated decoding parameter 445. In an example, the updated decoding parameter is a fusion of the additional information 435 provided by each decoding attempt. For example, the updated decoding parameter 445 includes additional information associated with the first decoding attempt 410, the second decoding attempt 420 and/or the Nth decoding attempt 430.

The updated decoding parameter 445 is provided to the decoder for a subsequent decoding attempt. For example, the updated decoding parameter 445 is to a M+i decoding attempt 450. If the M+i decoding attempt 450 is unsuccessful, information associated with the failed M+i decoding attempt (e.g., M+i decoding information 455) is provided to the decoder gear determination system 440. The decoder gear determination system 440 may then generate a new updated decoding parameter 445 and provide it to the decoder.

In an example, the fusion of the additional information 435 may occur after each failed decoding attempt. For example, if the first decoding attempt 410 fails, the updated decoding parameter 445 only includes additional information 435 associated with the first decoding attempt 410. If the second decoding attempt 420 fails, the updated decoding parameter 445 includes additional information associated with the first decoding attempt 410 and the second decoding attempt 420.

In another example, the updated decoding parameter 445 includes additional information 435 associated with all failed decoding attempts. However, if the M+i decoding attempt 450 fails, the decoder gear determination system 440 generates a new updated decoding parameter 445 using M+i decoding information 455 and one or more decoding parameters and/or one or more parameters that change the decoder dynamics such as previously discussed.

In an example, if the M+ith decoding attempt 450 is unsuccessful, the decoder gear determination system 440 initiates a gear shift and a second type of decoder is used to decode the codeword.

Figure 5:
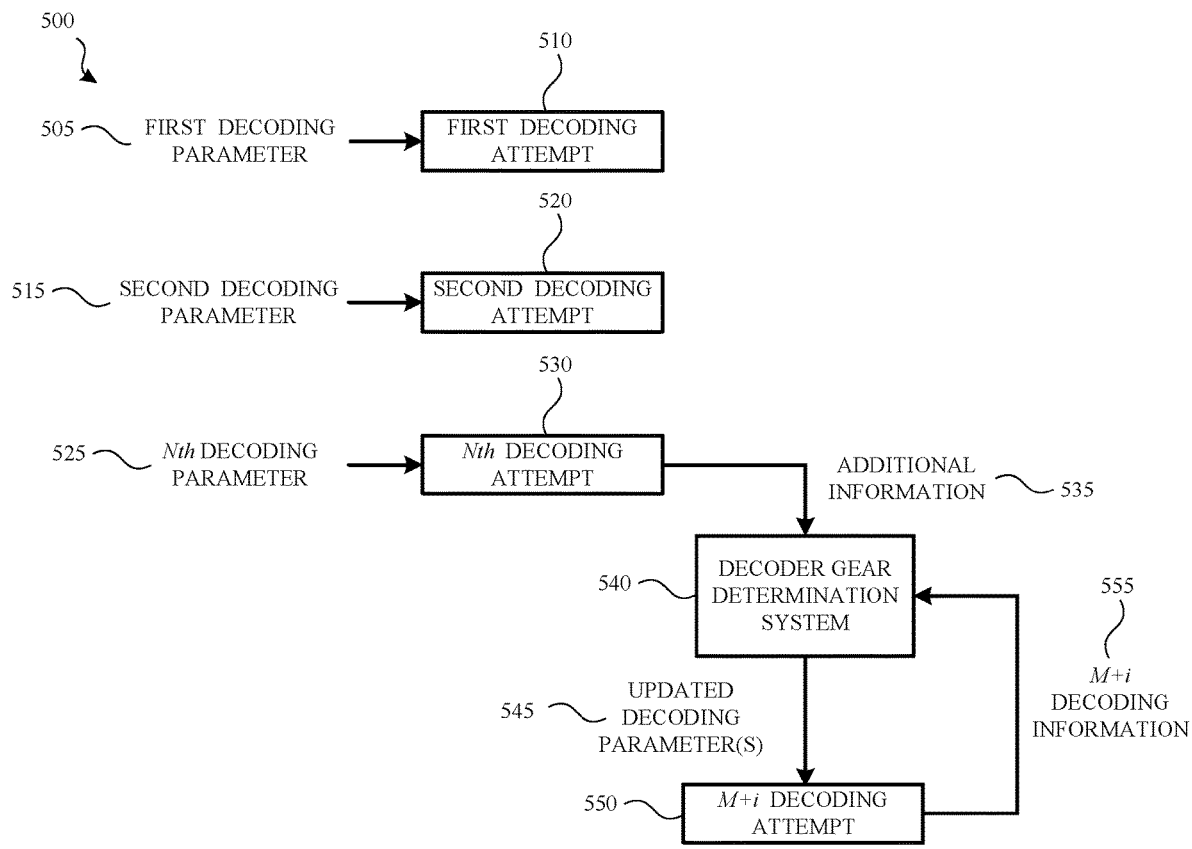
FIG. 5 is a flow diagram that illustrates how error correction capabilities of a decoder are updated with derived information according to a fourth example.

FIG. 5 is a flow diagram 500 that illustrates how error correction capabilities of a decoder are updated with derived information according to a fourth example. Like the example shown and described with respect to FIG. 3, multiple decoders operate in parallel and have a first amount of error correction capabilities.

Although decoders and decoding attempts are executed in parallel, each decoding attempt uses a different decoding parameter. For example, a first decoding attempt 510 is executed using a first decoding parameter 505, a second decoding attempt 520 is executed using a second decoding parameter 515 that is different than the first decoding parameter 505, and an Nth decoding attempt 530 is executed or performed using an Nth decoding parameter 525.

If an ECC system (e.g., ECC system 185 (FIG. 1)) and/or a decoder gear determination system 540 determines that at least one of the decoding attempts is successful, the other decoding attempts will cease. However, if the ECC system and/or a decoder gear determination system 540 determines that all of the N decoding attempts have failed, additional information 535 associated with each of the decoding attempts is provided to the decoder gear determination system 540. In an example, the decoder gear determination system 540 is similar to the decoder gear determination system 180 shown and described with respect to FIG. 1.

When the additional information 535 associated with the N decoding attempts is received, the decoder gear determination system 540 uses the additional information 535 to generate an updated decoding parameter 545. In an example, the updated decoding parameter 545 is a fusion of the additional information 535 provided by each decoding attempt. For example, the updated decoding parameter 545 includes additional information associated with one or more of the first decoding attempt 510, the second decoding attempt 520 and/or the Nth decoding attempt 530.

The updated decoding parameter 545 is provided to the decoder for a subsequent decoding attempt. For example, the updated decoding parameter 545 is provided to a decoder for a M+i decoding attempt 550. If the M+i decoding attempt 550 is unsuccessful, information associated with the failed M+i decoding attempt (e.g., M+i decoding information 555) is provided to the decoder gear determination system 540. The decoder gear determination system 540 may then generate a new updated decoding parameter 545 and provide it to the decoder.

In an example, this process repeats for a predetermined number of times. However, in an example, each updated decoding parameter that is generated using the M+i decoding information 555 is given a lower confidence level. When the M+i decoding information 555 reaches a confidence level threshold, or if a subsequent M+ith decoding attempt 550 is unsuccessful, the decoder gear determination system 540 initiates a gear shift and a second type of decoder is used to decode the codeword.

Figure 6:
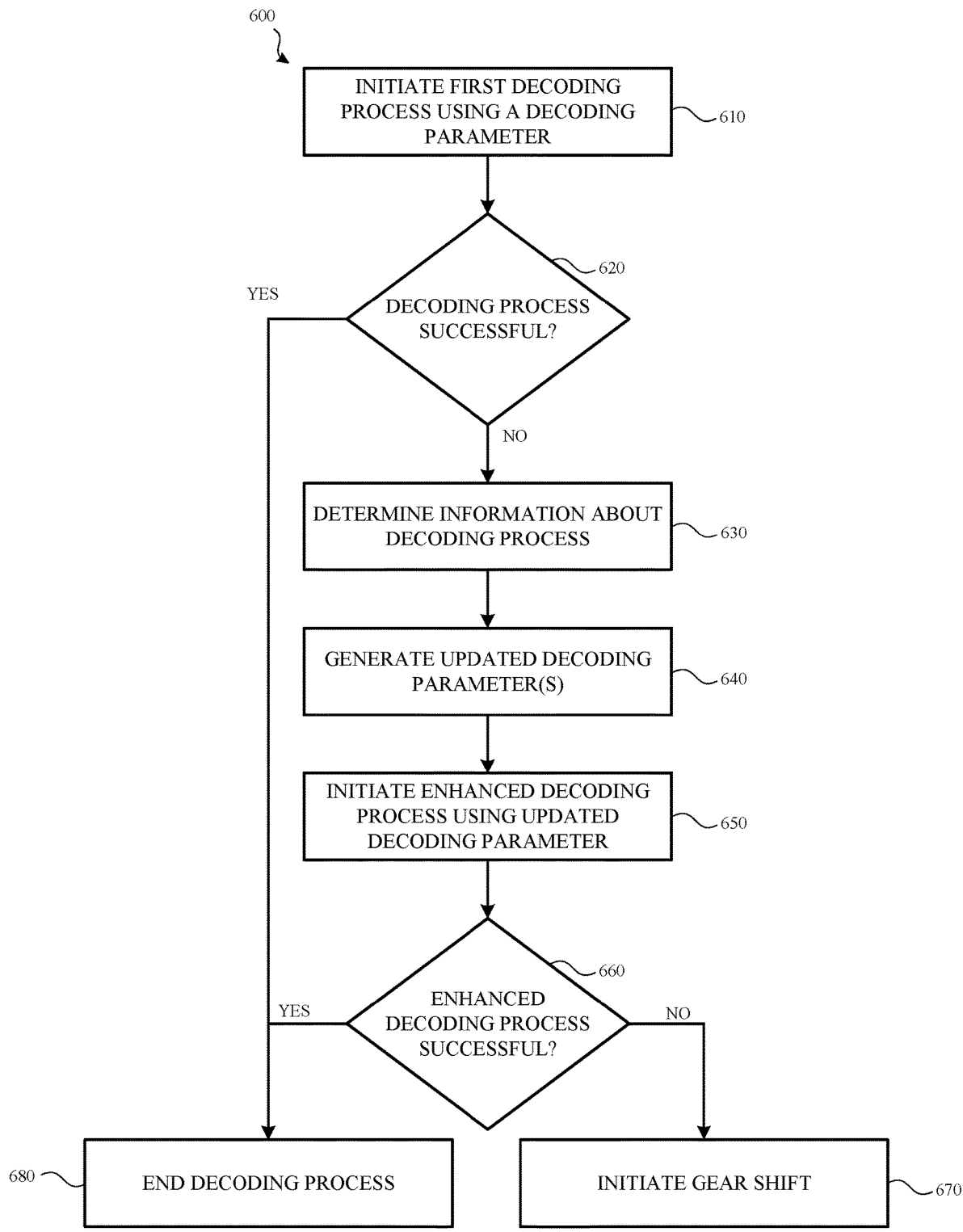
FIG. 6 illustrates a method for enhancing error correction capabilities of a decoder of a data storage device according to an example.

FIG. 6 illustrates a method 600 for enhancing correction capabilities of a decoder of a data storage device according to an example. In an example, the method 600 may be performed by an ECC system and/or a decoder gear determination system of the data storage device, such as, for example, the ECC system 185 and/or the decoder gear determination system 180 shown and described with respect to FIG. 1.

In an example, the method 600 begins when a first decoding process is initiated (610). The first decoding process is initiated when a codeword is identified and provided to a first type of decoder. Additionally, the first decoding process is associated with a decoding parameter.

The decoder gear determination system and/or the ECC system of the data storage device determines (620) whether the codeword was successfully decoded. If the decoder gear determination system and/or the ECC system determine the codeword was successfully decoded, the decoding process ends (680). However, if the decoder gear determination system and/or the ECC system determine the codeword was not successfully decoded, the decoder gear determination system and/or the ECC system determine (630) or derive information about the unsuccessful decoding process.

The derived/determined information is then used to generate (640) one or more updated decoding parameters. In an example, the one or more updated decoding parameters include information regarding the unsuccessful decoding process and the decoding parameter.

The decoder gear determination system and/or the ECC system provide the one or more updated decoding parameters to the decoder to enhance the error correction capabilities of the decoder. Additionally, the decoder gear determination system and/or the ECC system determine initiate (650) an enhanced decoding process using the one or more updated decoding parameters.

The decoder gear determination system and/or the ECC system then determine (660) whether the enhanced decoding process was successful. If it is determined (660) the enhanced decoding process was successful, the decoding process ends (680). However, if it is determined (660) the enhanced decoding process was unsuccessful, the decoder gear determination system and/or the ECC system initiate a gear shift 670. In an example, when the gear shift is initiated, the method 600 is repeated using a second type of decoder.

In an example, one or more of the operations of the method 600 may be repeated prior to moving to other operations. For example, operation 610 and operation 620 may be repeated multiple times prior to execution of operation 630 and/or 640. Likewise, operation 640, operation 650 and operation 660 may be repeated multiple times prior to execution of operation 670.

Figure 7:
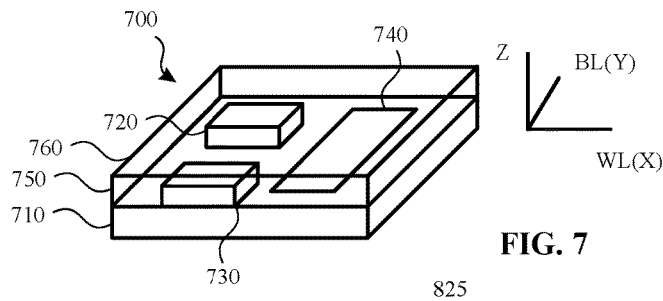
FIG. 7 is a perspective view of a storage device that includes three-dimensional (3D) stacked non-volatile memory according to an example.
Figure 8:
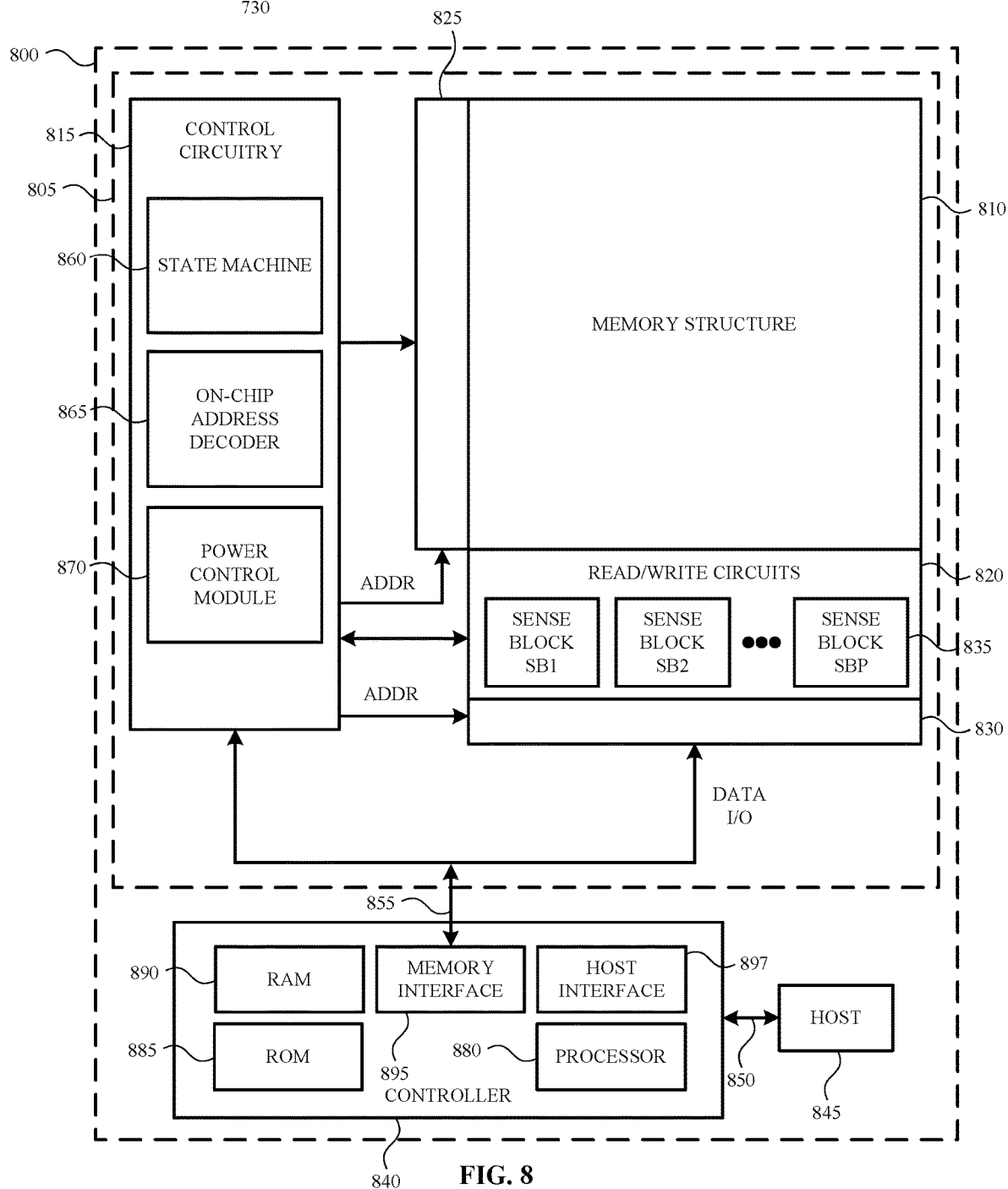
FIG. 8 is a block diagram of a storage device according to an example.

FIG. 7-FIG. 8 describe example storage devices that may be used with or otherwise implement the various features described herein. For example, the storage devices shown and described with respect to FIG. 7-FIG. 8 may include various systems and components that are similar to the systems and components shown and described with respect to FIG. 1. For example, the controller 840 shown and described with respect to FIG. 8 may be similar to the controller 150 of FIG. 1. Likewise, the memory dies 805 may be similar to the first memory die 165 and/or the second memory die 170 of FIG. 1.

FIG. 7 is a perspective view of a storage device 700 that includes three-dimensional (3D) stacked non-volatile memory according to an example. In this example, the storage device 700 includes a substrate 710. Blocks of memory cells are included on or above the substrate 710. The blocks may include a first block (BLK0 720) and a second block (BLK1 730). Each block may be formed of memory cells (e.g., non-volatile memory elements). The substrate 710 may also include a peripheral area 740 having support circuits that are used by the first block and the second block.

The substrate 710 may also carry circuits under the blocks, along with one or more lower metal layers which are patterned in conductive paths to carry signals from the circuits. The blocks may be formed in an intermediate region 750 of the storage device 700. The storage device may also include an upper region 760. The upper region 760 may include one or more upper metal layers that are patterned in conductive paths to carry signals from the circuits. Each block of memory cells may include a stacked area of memory cells. In an example, alternating levels of the stack represent word lines. While two blocks are depicted, additional blocks may be used and extend in the x-direction and/or the y-direction.

In an example, a length of a plane of the substrate 710 in the x-direction represents a direction in which signal paths for word lines or control gate lines extend (e.g., a word line or drain-end select gate (SGD) line direction) and the width of the plane of the substrate 710 in the y-direction represents a direction in which signal paths for bit lines extend (e.g., a bit line direction). The z-direction represents a height of the storage device 700.

FIG. 8 is a functional block diagram of a storage device 800 according to an example. In an example, the storage device 800 is the 3D stacked non-volatile storage device 700 shown and described with respect to FIG. 7. The components depicted in FIG. 8 may be electrical circuits. In an example, the storage device 800 includes one or more memory dies 805. Each memory die 805 includes a three-dimensional memory structure 810 of memory cells (e.g., a 3D array of memory cells), control circuitry 815, and read/write circuits 820. In another example, a two-dimensional array of memory cells may be used. The memory structure 810 is addressable by word lines using a first decoder 825 (e.g., a row decoder) and by bit lines using a second decoder 830 (e.g., a column decoder). The read/write circuits 820 may also include multiple sense blocks 835 including SB1, SB2, . . . , SBp (e.g., sensing circuitry) which allow pages of the memory cells to be read or programmed in parallel. The sense blocks 835 may include bit line drivers.

In an example, a controller 840 is included in the same storage device 800 as the one or more memory dies 805. In another example, the controller 840 is formed on a die that is bonded to a memory die 805, in which case each memory die 805 may have its own controller 840. In yet another example, a controller die controls all of the memory dies 805.

Commands and data may be transferred between a host 845 and the controller 840 using a data bus 850. Commands and data may also be transferred between the controller 840 and one or more of the memory dies 805 by way of lines 855. In one example, the memory die 805 includes a set of input and/or output (I/O) pins that connect to lines 855.

The memory structure 810 may also include one or more arrays of memory cells. The memory cells may be arranged in a three-dimensional array or a two-dimensional array. The memory structure 810 may include any type of non-volatile memory that is formed on one or more physical levels of arrays of memory cells having an active area disposed above a silicon substrate. The memory structure 810 may be in a non-volatile memory device having circuitry associated with the operation of the memory cells, whether the associated circuitry is above or within the substrate.

The control circuitry 815 works in conjunction with the read/write circuits 820 to perform memory operations (e.g., erase, program, read, and others) on the memory structure 810. The control circuitry 815 may include registers, ROM fuses, and other devices for storing default values such as base voltages and other parameters.

The control circuitry 815 may also include a state machine 860, an on-chip address decoder 865 and a power control module 870. The state machine 860 may provide chip-level control of various memory operations. The state machine 860 may be programmable by software. In another example, the state machine 860 does not use software and is completely implemented in hardware (e.g., electrical circuits). The on-chip address decoder 865 may provide an address interface between addresses used by host 845 and/or the controller 840 to a hardware address used by the first decoder 825 and the second decoder 830.

The power control module 870 may control power and voltages that are supplied to the word lines and bit lines during memory operations. The power control module 870 may include drivers for word line layers in a 3D configuration, select transistors (e.g., SGS and SGD transistors) and source lines. The power control module 870 may include one or more charge pumps for creating voltages.

The control circuitry 815, the state machine 860, the on-chip address decoder 865, the first decoder 825, the second decoder 830, the power control module 870, the sense blocks 835, the read/write circuits 820, and/or the controller 840 may be considered one or more control circuits and/or a managing circuit that perform some or all of the operations described herein.

In an example, the controller 840, is an electrical circuit that may be on-chip or off-chip. Additionally, the controller 840 may include one or more processors 880, ROM 885, RAM 890, memory interface 895, and host interface 897, all of which may be interconnected. In an example, the one or more processors 880 is one example of a control circuit. Other examples can use state machines or other custom circuits designed to perform one or more functions. Devices such as ROM 885 and RAM 890 may include code such as a set of instructions. One or more of the processors 880 may be operable to execute the set of instructions to provide some or all of the functionality described herein.

Alternatively or additionally, one or more of the processors 880 may access code from a memory device in the memory structure 810, such as a reserved area of memory cells connected to one or more word lines. The memory interface 895, in communication with ROM 885, RAM 890, and one or more of the processors 880, may be an electrical circuit that provides an electrical interface between the controller 840 and the memory die 805. For example, the memory interface 895 may change the format or timing of signals, provide a buffer, isolate from surges, latch I/O, and so forth.

The one or more processors 880 may issue commands to control circuitry 815, or any other component of memory die 805, using the memory interface 895. The host interface 897, in communication with the ROM 885, the RAM 895, and the one or more processors 880, may be an electrical circuit that provides an electrical interface between the controller 840 and the host 845. For example, the host interface 897 may change the format or timing of signals, provide a buffer, isolate from surges, latch I/O, and so on. Commands and data from the host 845 are received by the controller 840 by way of the host interface 897. Data sent to the host 845 may be transmitted using the data bus 850.

Multiple memory elements in the memory structure 810 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

One of ordinary skill in the art will recognize that the technology described herein is not limited to a single specific memory structure, but covers many relevant memory structures within the spirit and scope of the technology as described herein and as understood by one of ordinary skill in the art.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device (e.g., host device 105 (FIG. 1)). Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Examples of the present disclosure describe a method, comprising: initiating a first decoding process on a codeword using a decoder of a first type, the first decoding process utilizing a first decoding parameter; based, at least in part, on determining the first decoding process is unsuccessful, deriving information associated with the first decoding process; and initiating a second decoding process using the decoder, the second decoding process utilizing an updated parameter that is based, at least in part, on the information derived from the first decoding process. In an example, the method also includes based, at least in part, on determining the second decoding process is unsuccessful, initiating a third decoding process using a second decoder of a second type different from the first type. In an example, the first type of decoder has a first error correction capability and the second type of decoder has a second error correction capability. In an example, the method also includes initiating another decoding process on the codeword using the decoder, the another decoding process occurring before the second decoding process and utilizing another decoding parameter, wherein the first decoding process and the another decoding process are initiated in sequence. In an example, the decoder comprises a pool of decoders of the first type, the method further comprising: initiating another decoding process on the codeword using the decoder, the another decoding process occurring before the second decoding process and utilizing another decoding parameter, wherein the first decoding process and the another decoding process are initiated in parallel and are performed by two separate decoders of the pool of decoders. In an example, the information derived from the first decoding process also includes information derived from the another decoding process when it is determined that the another decoding process is unsuccessful. In an example, the method also includes based, at least in part, on determining the second decoding process is unsuccessful, deriving information associated with the second decoding process; and initiating a third decoding process using the decoder, the third decoding process utilizing a third decoding parameter that is based, at least in part, on the information derived from the second decoding process. In an example, the first decoding parameter is selected from a group of decoding parameters comprising one or more of: a decoding schedule; a bit flip threshold; a log likelihood ratio (LLR); bits that are marked as suspected bit flips; bits that are marked as correct; bits that are marked to be skipped; and a number of decoding iterations. In an example, the information that is derived from the first decoding process includes one or more of: an indication of one or more bits that were flipped from an initial state during the first decoding process; an indication of one or more bits that were flipped during the first decoding process; an indication of one or more bits that were flipped more than a predetermined number of times during the first decoding process; an indication of one or more bits that are marked as suspected bit flips; an indication of one or more bits that identified as correct; an indication of one or more bits that have a log likelihood ratio (LLR) value below or above a LLR value threshold; an indication of one or more bits that were flipped during different phases of the first decoding process; and an indication of one or more bits that were flipped when a syndrome weight (SW) is above or below a SW threshold. In an example, the information derived from the first decoding process comprises one or more of: an indication that marked bits are given deferential treatment; an indication that a decoding order is to be changed; and an indication that a flipping threshold per clock is to be changed.

Other examples describe a data storage device, comprising: a controller; a first decoder of a first type, and a second decoder of a second type different from the first type; and a decoder gear determination system communicatively coupled to the controller and the first and second decoders, and operable to: derive decoding information from a failed codeword decoding process executed by the first decoder, the derived decoding information including information about the failed codeword decoding process; generate a decoding parameter based, at least in part, on the derived decoding information; and cause the first decoder to initiate a codeword decoding process using the decoding parameter. In an example, the decoder gear determination system is further operable to initiate another codeword decoding process using the second decoder based, at least in part, on a determination that the codeword decoding process performed by the first decoder is unsuccessful. In an example, the decoder gear determination system is further operable to: derive decoding information from a plurality of failed codeword decoding processes that were executed by the first decoder, wherein the plurality of failed codeword decoding processes were executed sequentially. In an example, the first decoder comprises a pool of decoders including two or more decoders of the first type, wherein the decoder gear determination system is further operable to: derive decoding information from a plurality of failed codeword decoding processes that were executed by the two or more first decoders of the pool of decoders, wherein the plurality of failed codeword decoding processes were executed simultaneously. In an example, the failed codeword decoding process is associated with at least one parameter selected from a group of parameters, comprising one or more of: a decoding schedule; a bit flip threshold; a log likelihood ratio (LLR); bits that are marked as suspected bit flips; bits that are marked as correct; bits that are marked to be skipped; and a number of decoding iterations. In an example, the decoding information derived from the failed codeword decoding process includes at least one of: an indication of one or more bits that were flipped from an initial state during the failed codeword decoding process; an indication of one or more bits that were flipped during the failed codeword decoding process; an indication of one or more bits that were flipped more than a predetermined number of times during the failed codeword decoding process; an indication of one or more bits that are marked as suspected bit flips; an indication of one or more bits that identified as correct; an indication of one or more bits that have a log likelihood ratio (LLR) value below or above a LLR value threshold; an indication of one or more bits that were flipped during different phases of the failed codeword decoding process; and an indication of one or more bits that were flipped when a syndrome weight (SW) is above or below a SW threshold. In an example, the decoding parameter comprises at least one of: an indication that marked bits are given deferential treatment; an indication that a decoding order is to be changed; and an indication that a flipping threshold per clock is to be changed.

Still other examples describe a data storage device, comprising: a control means; and a decoder gear selection means communicatively coupled to the control means and operable to: initiate a first decoding process on a codeword using a decoding means, the first decoding process utilizing a first decoding parameter; based, at least in part, on determining the first decoding process is unsuccessful, derive information associated with the first decoding process; generate a second decoding parameter based, at least in part, on the information derived from the first decoding process; and initiate a second decoding process on the codeword using the decoding means, the second decoding process utilizing the second decoding parameter. In an example, the decoder gear selection means is further operable to initiate a third decoding process on the codeword using another decoding means based, at least in part, on a determination the second decoding process is unsuccessful. In an example, the decoder gear selection means is further operable to: derive decoding information from a plurality of decoding processes that were executed by the decoding means, wherein the plurality of decoding processes were executed simultaneously.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
    initiating a first decoding process on a codeword using a first type of decoder from a pool of decoders of a first type, the first decoding process utilizing a first decoding parameter and having a first error correction capability;
    initiating a second decoding process on the codeword in parallel with the first decoding process, the second decoding process using a second decoder from the pool of decoders of the first type and utilizing a second decoding parameter and having a second error correction capability;
    based, at least in part, on determining the first decoding process using the first decoder and the second decoding process using the second decoder are unsuccessful, deriving information associated with the first decoding process and the second decoding process; and
    initiating a third decoding process using a decoder from the pool of decoders of the first type, the third decoding process utilizing an updated parameter that is based, at least in part, on the information derived from the first decoding process and the second decoding process, wherein the third decoding process has a third error correction capability that is greater than the first error correction capability and the second error correction capability.

2. The method of claim 1, further comprising:
    based, at least in part, on determining the third decoding process is unsuccessful, initiating a fourth decoding process using a decoder from a pool of decoders of a second type that is different from the pool of decoders of the first type.

3. The method of claim 2, wherein the pool of decoders of the second type have an increased error correction capability when compared to the pool of decoders of the first type.

4. The method of claim 1, wherein the first decoding parameter is selected from a group of decoding parameters comprising one or more of:
    a decoding schedule;
    a bit flip threshold;
    a log likelihood ratio (LLR);
    bits that are marked as suspected bit flips;
    bits that are marked as correct;
    bits that are marked to be skipped; and
    a number of decoding iterations.

5. The method of claim 1, wherein the information that is derived from the first decoding process includes one or more of:
    an indication of one or more bits that were flipped from an initial state during the first decoding process;
    an indication of one or more bits that were flipped during the first decoding process;

an indication of one or more bits that were flipped more than a predetermined number of times during the first decoding process;

an indication of one or more bits that are marked as suspected bit flips;

an indication of one or more bits that identified as correct;

an indication of one or more bits that have a log likelihood ratio (LLR) value below or above a LLR value threshold;

an indication of one or more bits that were flipped during different phases of the first decoding process; and an indication of one or more bits that were flipped when a syndrome weight (SW) is above or below a SW threshold.

6. The method of claim 1, wherein the information derived from the first decoding process comprises one or more of:

an indication that marked bits are given deferential treatment;

an indication that a decoding order is to be changed; and an indication that a flipping threshold per clock is to be changed.

7. The method of claim 1, wherein the third decoding process is associated with a decoding process threshold.

8. A data storage device, comprising:

a controller; and a decoder gear determination system communicatively coupled to the controller and operable to:

derive first decoding information from a first failed codeword decoding process executed by a first decoder, the first decoding information including information about the first failed codeword decoding process;

derive second decoding information from a second failed codeword decoding process executed by the first decoder, the second failed codeword decoding process using the first decoding information that was derived from the first failed codeword decoding process, the second decoding information including information about the second failed codeword decoding process;

generate a decoding parameter based, at least in part, on the second decoding information; and cause the first decoder to initiate a codeword decoding process using the generated decoding parameter, the codeword decoding process having a higher decoding capability when compared to a decoding capability of the first failed codeword decoding process and the second failed codeword decoding process.

9. The data storage device of claim 8, wherein the first decoder is a first type of decoder and wherein the decoder gear determination system is further operable to initiate another codeword decoding process using a second type of decoder based, at least in part, on a determination that the codeword decoding process using the generated decoding parameter is unsuccessful.

10. The data storage device of claim 8, wherein the decoder gear determination system is further operable to:

derive decoding information from a plurality of failed codeword decoding processes that were executed by the first decoder, wherein the plurality of failed codeword decoding processes were executed sequentially.

11. The data storage device of claim 8, wherein the first decoder is selected from a pool of decoders including two or more first type of decoders, wherein the decoder gear determination system is further operable to:

derive decoding information from a plurality of failed codeword decoding processes that were executed by the two or more first type of decoders of the pool of decoders, wherein the plurality of failed codeword decoding processes were executed simultaneously.

12. The data storage device of claim 8, wherein the first failed codeword decoding process is associated with at least one parameter selected from a group of parameters, comprising one or more of:

a decoding schedule;

a bit flip threshold;

a log likelihood ratio (LLR);

bits that are marked as suspected bit flips;

bits that are marked as correct;

bits that are marked to be skipped; and a number of decoding iterations.

13. The data storage device of claim 8, wherein the first decoding information derived from the first failed codeword decoding process includes at least one of:

an indication of one or more bits that were flipped from an initial state during the first failed codeword decoding process;

an indication of one or more bits that were flipped during the first failed codeword decoding process;

an indication of one or more bits that were flipped more than a predetermined number of times during the first failed codeword decoding process;

an indication of one or more bits that are marked as suspected bit flips;

an indication of one or more bits that identified as correct;

an indication of one or more bits that have a log likelihood ratio (LLR) value below or above a LLR value threshold;

an indication of one or more bits that were flipped during different phases of the first failed codeword decoding process; and an indication of one or more bits that were flipped when a syndrome weight (SW) is above or below a SW threshold.

14. The data storage device of claim 8, wherein the first decoding parameter comprises at least one of:

an indication that marked bits are given deferential treatment;

an indication that a decoding order is to be changed; and an indication that a flipping threshold per clock is to be changed.

15. The data storage device of claim 8, wherein the decoder gear determination system is further operable to determine whether a threshold number of failed codeword decoding processes have been executed by the first decoder.

16. A data storage device, comprising:

a control means; and a decoder gear selection means communicatively coupled to the control means and operable to:

initiate a first decoding process on a codeword using a first decoding means, the first decoding process utilizing a first decoding parameter and having a first error correction capability;

based, at least in part, on determining the first decoding process is unsuccessful, derive first information associated with the first decoding process;

initiate a second decoding process on the codeword using a second decoding means, the second decoding process using a second decoding parameter and having a second error correction capability;

based, at least in part, on determining the second decoding process is unsuccessful, derive second information associated with the second decoding process;

generate a third decoding parameter based, at least in part, on the first information and the second information; and initiate a third decoding process on the codeword using a third decoding means, the third decoding process utilizing the third decoding parameter, wherein the third decoding process has a third error correction capability that is greater than the first error correction capability and the second error correction capability.

17. The data storage device of claim 16, wherein the decoder gear selection means is further operable to initiate a fourth decoding process on the codeword using another decoding means based, at least in part, on a determination the third decoding process is unsuccessful.

18. The data storage device of claim 17, wherein the first decoding process and the second decoding process are executed simultaneously.

19. The data storage device of claim 17, wherein the another decoding means is a type of decoding means that is different from a type of decoding means of one or more of the first decoding means, the second decoding means and the third decoding means.

20. The data storage device of claim 16, wherein the first information includes at least one of:

an indication of one or more bits that were flipped from an initial state during the first decoding process;

an indication of one or more bits that were flipped during the first decoding process;

an indication of one or more bits that were flipped more than a predetermined number of times during the first decoding process;

an indication of one or more bits that are marked as suspected bit flips;

an indication of one or more bits that identified as correct;

an indication of one or more bits that have a log likelihood ratio (LLR) value below or above a LLR value threshold;

an indication of one or more bits that were flipped during different phases of the first decoding process; and an indication of one or more bits that were flipped when a syndrome weight (SW) is above or below a SW threshold.

* * * * *